(12) United States Patent
Kim

(10) Patent No.: US 7,758,228 B2
(45) Date of Patent: Jul. 20, 2010

(54) BACKLIGHT UNIT

(75) Inventor: Chong Ho Kim, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 11/172,521

(22) Filed: Jun. 30, 2005

(65) Prior Publication Data

US 2006/0002150 A1    Jan. 5, 2006

(30) Foreign Application Priority Data

Jun. 30, 2004  (KR) .................... 10-2004-0050327

(51) Int. Cl.
*F21V 7/04* (2006.01)
(52) U.S. Cl. ...................... 362/609; 362/623
(58) Field of Classification Search .................. 362/31, 362/609, 623
See application file for complete search history.

(56) References Cited

U.S. PATENT DOCUMENTS

| | | | |
|---|---|---|---|
| 6,108,059 A * | 8/2000 | Yang | 362/606 |
| 6,441,874 B1 * | 8/2002 | Saito et al. | 349/70 |
| 6,771,327 B2 * | 8/2004 | Sekiguchi | 349/12 |
| 2002/0045030 A1 * | 4/2002 | Ozin et al. | 428/173 |
| 2003/0184993 A1 * | 10/2003 | Yamada | 362/31 |
| 2003/0218704 A1 * | 11/2003 | Lee et al. | 349/106 |
| 2004/0027675 A1 * | 2/2004 | Wu et al. | 359/619 |
| 2004/0136673 A1 * | 7/2004 | Kinoshita | 385/129 |
| 2004/0224154 A1 * | 11/2004 | Toda et al. | 428/402 |
| 2004/0246403 A1 * | 12/2004 | Kim et al. | 349/65 |
| 2005/0063451 A1 * | 3/2005 | Abe et al. | 374/121 |

OTHER PUBLICATIONS http://dictionary.reference.com/browse/random.*
http://www.merriam-webster.com/dictionary/randomly.*

* cited by examiner

*Primary Examiner*—Sandra L O'Shea
*Assistant Examiner*—William J Carter
(74) *Attorney, Agent, or Firm*—Brinks Hofer Gilson & Lione

(57) ABSTRACT

A backlight unit of an LCD device is disclosed in which a light-diffusion substance below a light-guiding plate is formed as one body with a reflecting sheet by using a photonic crystal reflecting sheet to improve color purity. The backlight unit includes a lamp; a photonic crystal reflecting sheet having a plurality of parts; and a plurality of sheets formed above the photonic crystal reflecting sheet. Each part of the photonic crystal reflecting sheet includes a photonic crystal for selectively reflecting the light of a predetermined wavelength in the light emitted from the lamp. The wavelengths are different, thereby permitting the photonic crystal to reflect different colors in different areas.

6 Claims, 10 Drawing Sheets

BACKLIGHT UNIT

This application claims the benefit of the Korean Application No. P2004-50327 filed on Jun. 30, 2004, which is hereby incorporated by reference.

FIELD OF THE INVENTION

The present invention relates to a liquid crystal display (LCD) device, and more particularly, to a backlight unit of an LCD device, in which a light-diffusion substance below a light-guiding plate is formed as one body with a reflecting sheet by using a photonic crystal reflecting sheet, thereby improving color purity.

DISCUSSION OF THE RELATED ART

With the development of an information-based society, the demand for various display devices has dramatically increased. Accordingly, much effort has been invested in research and development of various flat display devices such as liquid crystal display (LCD), plasma display panel (PDP), electroluminescent display (ELD), and vacuum fluorescent display (VFD). Some of these flat display devices have already been applied to displays in various equipment.

Among the various flat display devices, the liquid crystal display (LCD) device has been most widely used due to its thinness, lightness in weight, and low power consumption. This permits the LCD device to substitute for a Cathode Ray Tube (CRT) display. In addition to mobile type LCD devices such as a display for a notebook computer, LCD devices have been developed for computer monitors and televisions to receive and display broadcast signals.

Despite various technical developments in the LCD technology with applications in different fields, research in enhancing the picture quality of the LCD device has been in some respects lacking as compared to other features and advantages of the LCD device. Therefore, in order to use the LCD device in various fields as a general display, further development of the LCD device has focused on whether the LCD device can implement a high quality picture, such as high resolution and high luminance with a large-sized screen while still maintaining lightness in weight, thinness, and low power consumption.

Generally, the LCD device includes an LCD panel for displaying a picture image, and a driving part for applying a driving signal to the LCD panel. The LCD panel includes first and second glass substrates bonded to each other at a predetermined interval, and a liquid crystal layer formed by injecting a liquid crystal material to a space between the first and second glass substrates.

On the first glass substrate (TFT array substrate), there are a plurality of gate lines arranged in a first direction at fixed intervals, a plurality of data lines arranged in a second direction perpendicular to the gate lines at fixed intervals, a plurality of pixel electrodes in respective pixel regions defined by the gate lines and the data lines, and a plurality of thin film transistors (TFTs) switchable in response to signals on the gate lines for transmission of signals on the data line to the pixel electrodes. This active matrix type LCD, which contains a thin film transistor and a pixel electrode connected and aligned in a matrix form, has been used due to its high resolution and its ability to represent animated images.

The second glass substrate (color filter array substrate) has a light-shielding layer for shielding light from areas excluding the pixel regions, a color filter layer (R, G, B) for displaying colors, and a common electrode for implementing a picture image.

The LCD device is driven according to optical anisotropy and polarizability of the liquid crystal material. Liquid crystal molecules are aligned using directional characteristics because the liquid crystal molecules have long and thin shapes. In this respect, an induced electric field is applied to the liquid crystal material for controlling the alignment direction of the liquid crystal molecules. That is, if the alignment direction of the liquid crystal molecules is controlled by the induced electric field, the light is polarized and changed by the optical anisotropy of the liquid crystal, thereby displaying the picture image.

The LCD device controls transmittance of ambient light to display the picture image. In this respect, the LCD device requires an additional light source such as a backlight. The backlight is classified into a direct-type backlight and an edge-type backlight according to a position of the lamp unit that supplies the light.

The LCD device uses a light source such as an Electro Luminescence (EL), a Light Emitting Diode (LED), a Cold Cathode Fluorescent Lamp (CCFL) or a Hot Cathode Fluorescent Lamp (HCFL). The CCFL has been primarily used as the light source for a large sized color TFT LCD device due to its long lifetime, low power consumption and thin profile.

For LCDs using a CCFL, a fluorescent discharge tube is used for the penning effect, which is formed by injecting a hydrargyrum gas containing Argon Ar and Neon Ne at a low temperature. Electrodes are formed at both ends of the fluorescent discharge tube, and the cathode is plate-shaped. When a voltage is applied thereto, electric charges inside the fluorescent discharge tube collide against the plate-shaped cathode, thereby generating secondary electrons. Circumferential elements are excited by the secondary electrons, whereby plasma is generated. The circumferential elements emit strong ultraviolet rays, and the ultraviolet rays excite a fluorescent substance coated on the tube walls, thereby emitting visible rays.

Hereinafter, a related art backlight unit will be described with reference to the accompanying drawings.

FIG. 1 is a perspective view of showing sheets in a related art backlight unit. As shown in FIG. 1, sheets 1, a light-guiding plate 2 and a reflector 3 are sequentially formed on an edge-type backlight unit according to the related art. The sheets 1 are formed of a first prism sheet 1a, a second prism sheet 1b and a light-diffusion sheet 1c.

The edge-type backlight unit according to the related art is provided below an LCD panel (not shown), and a lamp (not shown) is formed at the side of the light-guiding plate 2.

The lamp is formed of a CCFL, and a lamp housing of a metal material is provided at one side of the light-guiding plate 2 to surround the lamp.

The light-guiding plate 2 is a waveguide that guides the light emitted from the lamp so that the incident light is emitted as a plate type light source. That is, the light-guiding plate 2 is formed of Polymethyl Methacrylate (PMMA) having a good light transmittance. Generally, the lamp is slanted at the center of the light-guiding plate 2 in the thickness direction, thereby improving the efficiency of light incidence.

Next, a light-diffusion substance comprised of $SiO_2$ particles, PMMA and solvent, is provided to the lower surface of the light-guiding plate 2. $SiO_2$ particles having porosity are used for diffusing the light. PMMA is used for adhering $SiO_2$ particles to the lower surface of the light-guiding plate 2. The light-diffusion substance is coated on the lower surface of the light-guiding plate 2 in dotted patterns, and the sizes of the dotted patterns are gradually increased to obtain a uniform plate-type light source on an upper surface of the light-guiding plate 2. That is, the dotted pattern has a small size in a unit area near to the lamp, and the dotted pattern has a large size in a unit area apart from the lamp. The shape of the dotted pattern may be varied. If the dotted patterns has the same size, the respective dotted patterns have the same level of luminance regardless of the dotted shape.

Subsequently, the reflector 3 is formed by coating a reflective metal material on a transparent film such as PET (Polyethylene Terephthalate) or PC (Poly Carbonate). The reflector 3 is formed below the light-guiding plate 2, whereby the light emitted from the lamp is incident on the light-guiding plate 2.

The light-diffusion sheet 1c is provided above the light-guiding plate 2, whereby the light emitted through the light-guiding plate 2 is diffused to obtain the uniform luminance according to the viewing angle. The light-diffusion sheet 1c is formed of PET or PC. Then, a particle-coating layer is formed on the light-diffusion sheet 1c.

Subsequently, the first and second prism sheets 1a and 1b are provided to improve the frontal luminance of the light transmitted and reflected to the upper side of the light-diffusion sheet 1c. In this case, light of a predetermined incident angle is transmitted through the first and second prism sheets 1a and 1b, and light of other angles is totally reflected. As a result, the light is reflected to the lower side of the first and second prism sheets 1a and 1b, and then the reflected light is reflected again by the reflector 3 formed on the lower side of the light-guiding sheet 2.

Although not shown, the backlight unit having the aforementioned structure is fixed to a mold frame. A top case and a bottom cover protect the backlight unit and the LCD panel.

FIG. 2 illustrates the light passage inside the related art backlight unit of FIG. 1. As shown in FIG. 2, the light is emitted from the lamp formed at one side of the light-guiding plate 2, and then the light is transmitted to the light-guiding plate 2. Subsequently, the light is transmitted to the sheets 1 provided above the light-guiding plate 2, thereby displaying the image on the LCD panel. Some of the light leaks out through the lower side of the light-guiding plate 2, thereby causing light loss.

To compensate for light loss, the amount of light from the backlight is increased, thereby increasing the power consumption for the backlight unit. As the light transmitted to the LCD panel through the light-guiding plate 2 has no wavelength selection, the color purity is decreased.

In addition, the related art backlight unit is somewhat thick as the thickness of light-guiding plate corresponds to the diameter of lamp. Further, as indicated above, some of the light passing through the light-guiding plate leaks out through the lower side of the light-guiding plate, thereby causing the light loss. The light transmitted to the LCD panel through the light-guiding plate has no wavelength selection, lowering the color purity. Accordingly, for a high-resolution display, a high-performance color filter is used, thereby increasing the production cost.

SUMMARY OF THE INVENTION

By way of introduction only, in one aspect a backlight unit includes a lamp; a photonic crystal reflecting sheet having a plurality of parts, each part including photonic crystals that selectively reflect light of a different predetermined wavelength in the light emitted from the lamp; and a sheet formed above the photonic crystal reflecting sheet.

In another aspect, a backlight unit includes a lamp; a light-guiding plate formed at one side of the lamp; a photonic crystal reflecting sheet formed below the light-guiding plate, the photonic crystal reflecting sheet having a plurality of parts, each part including photonic crystals that selectively reflect light of a different predetermined wavelength in the light emitted from the lamp; and a sheet formed above the light-guiding plate.

In another aspect, a backlight unit includes a lamp array; a photonic crystal reflecting sheet covering lower and lateral sides of the lamp array, the photonic crystal reflecting sheet having a plurality of parts, each part including photonic crystals that selectively reflect light of a different predetermined wavelength in the light emitted from the lamp array; and a sheet formed above the photonic crystal reflecting sheet.

In another aspect, a method of fabricating a backlight unit includes: combining a photonic crystal reflecting sheet and at least one of a prism sheet or a light-diffusion sheet, and positioning a lamp such that light from the lamp is incident on the photonic crystal reflecting sheet. The photonic crystal reflecting sheet has a plurality of parts, each part including photonic crystals that selectively reflect light of a different predetermined wavelength.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a backlight unit of an LCD device according to the present invention will be described with reference to the accompanying drawings. In one embodiment, the backlight unit uses a photonic crystal reflecting sheet to form some of sheets as one body. Photonic crystals having selective transmission characteristics are in development. The photonic crystal selectively reflects only light of a predetermined wavelength, so that it is possible to improve the color purity of light outputted from a predetermined light source. More specifically, a photonic crystal transmits and reflects the predetermined wavelength when two dielectrics having the different refraction indexes are arranged in sequence. Thus, a light-diffusion substance below a light-guiding plate is formed as one body with the reflecting sheet, thereby improving the integration and improving the color purity.

Figure 1:
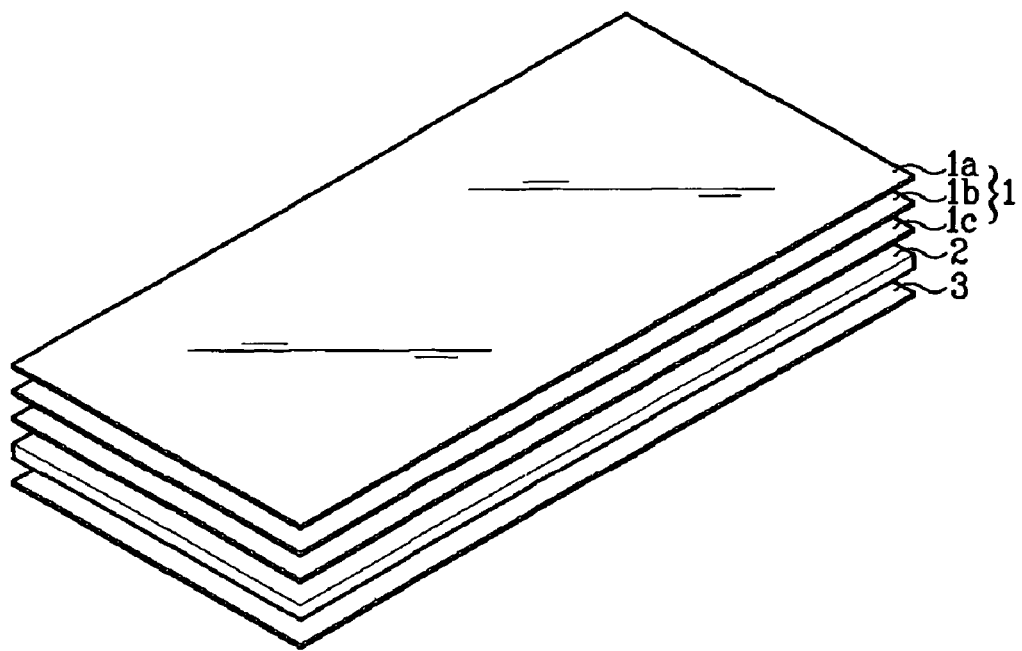
FIG. 1 is a perspective view of showing sheets inside a related art backlight unit.
Figure 2:
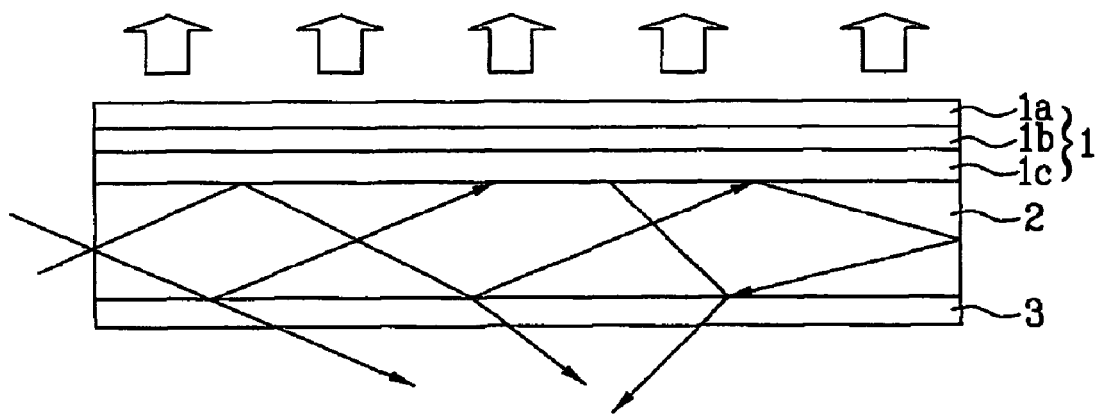
FIG. 2 shows the light passage in a related art backlight unit of FIG. 1.
Figure 3:
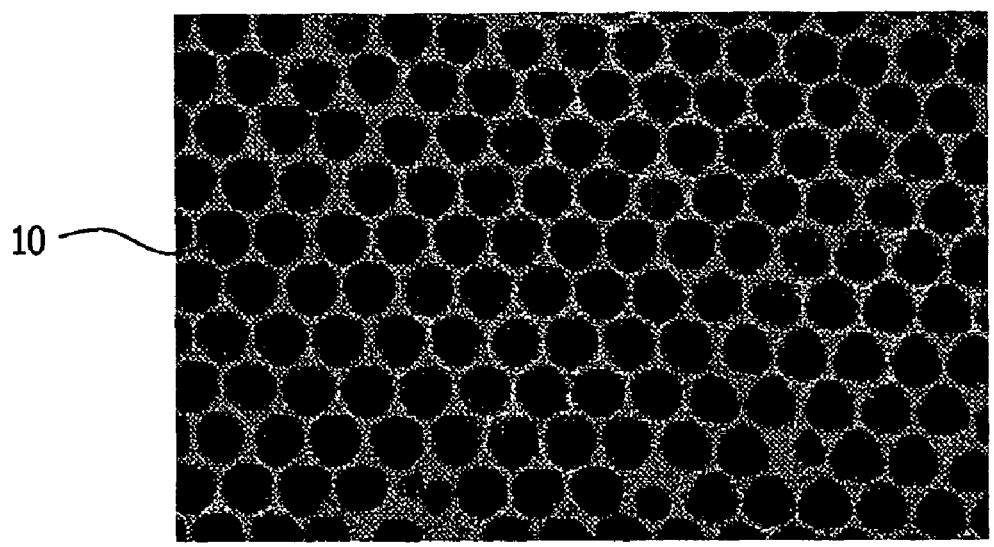
FIG. 3 shows the photonic crystal.

FIG. 3 shows a photonic crystal. As shown in FIG. 3, the photonic crystal reflects the light of the predetermined wavelength range. That is, the photonic crystal has a photonic bandgap, which is shown as a sphere-shaped particle 10. The photonic crystal has a variable reflection wavelength range of the light, that is, the photonic bandgap, according to the size or component of particle 10.

Figure 4:
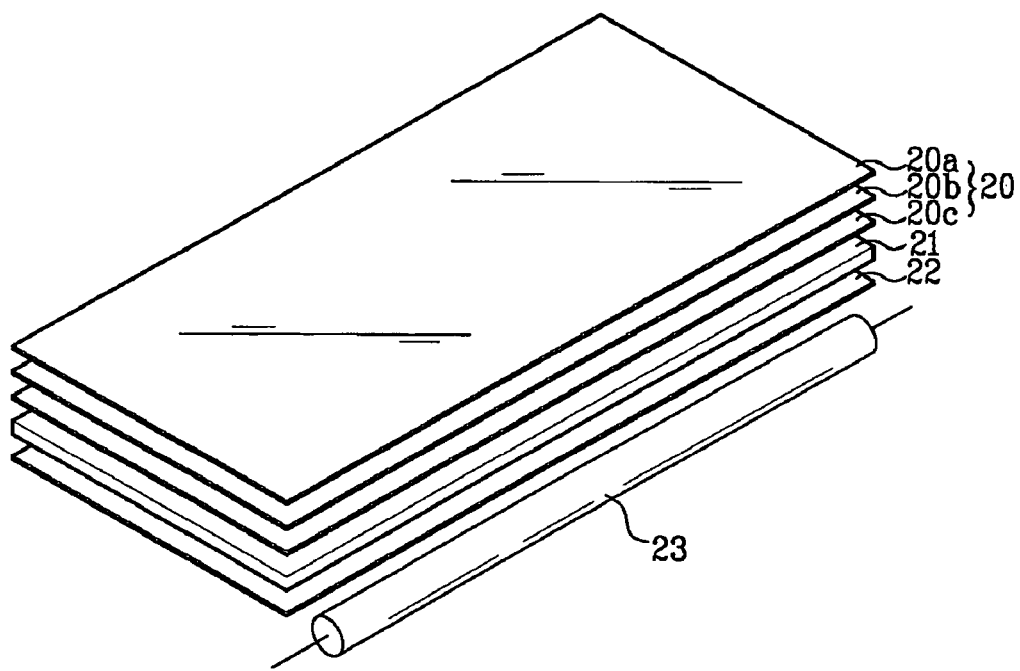
FIG. 4 is a perspective view of showing a backlight unit according to the present invention.
Figure 5:
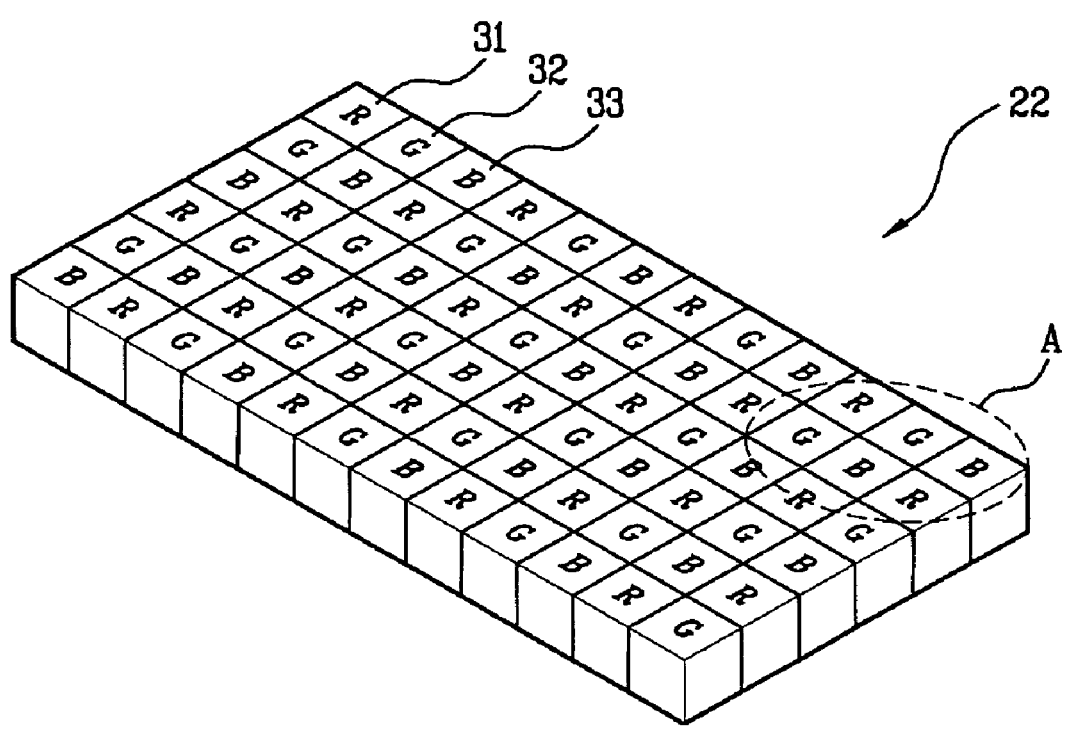
FIG. 5 shows a photonic crystal reflecting sheet of FIG. 4.
Figure 6:
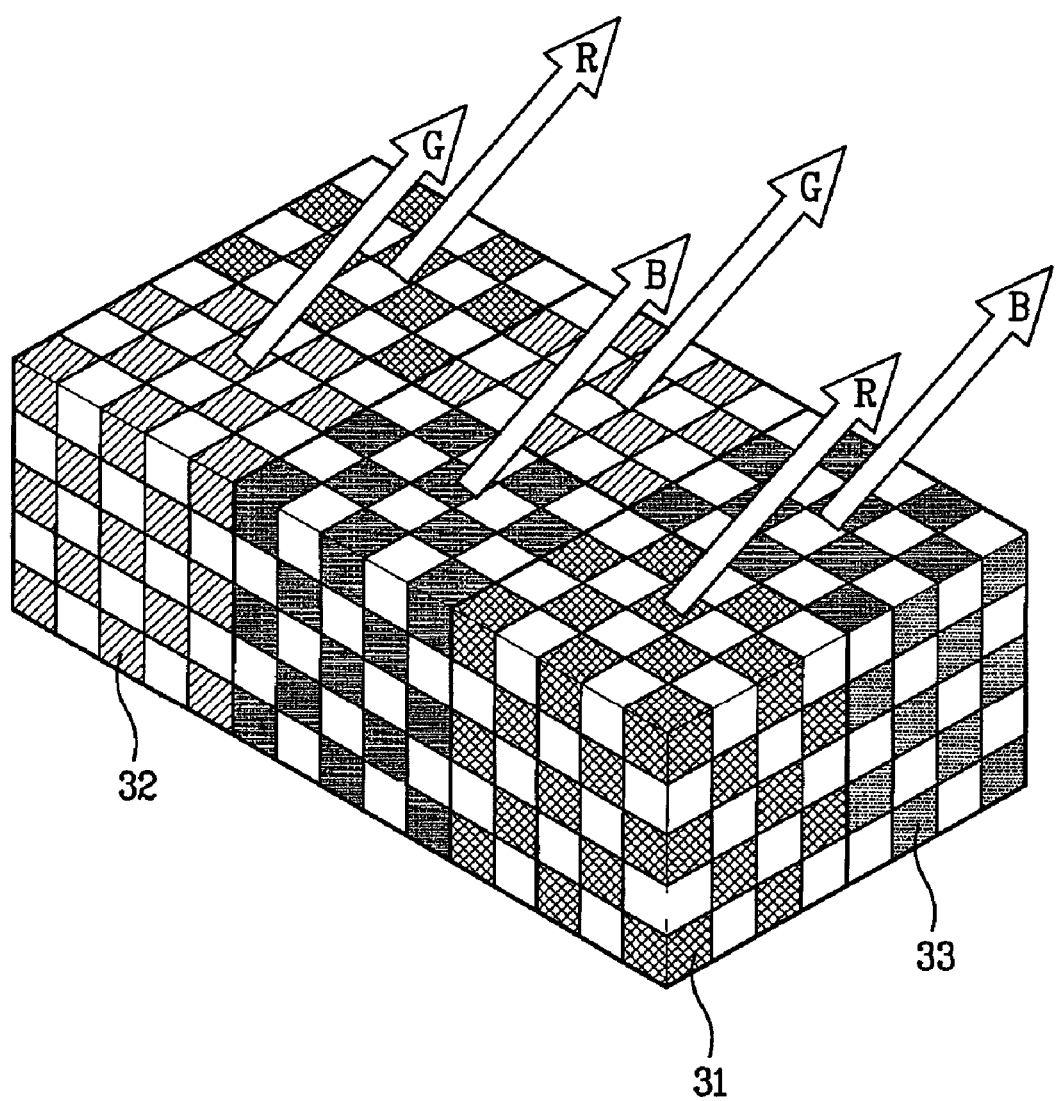
FIG. 6 is an expanded view of showing 'A' in FIG. 5.

FIG. 4 is a perspective view of showing a backlight unit according to the present invention. FIG. 5 is a perspective view of showing a photonic crystal reflecting sheet of FIG. 4. FIG. 6 is an expanded view of 'A' portion of FIG. 5.

As shown in FIG. 4, the backlight unit includes sheets 20, a light-guiding plate 21, and a photonic crystal reflecting sheet 22 sequentially formed from the top. The sheets 20 are comprised of first and second prism sheets 20a and 20b and a light-diffusion sheet 20c.

FIG. 4 shows the edge-type backlight unit. An LCD panel (not shown) is positioned above the sheets 20, and a lamp 23 is positioned at one side of the light-guiding plate 21.

The lamp is formed of a CCFL, and a lamp housing of a metal material is provided at one side of the light-guiding plate 21 to surround the lamp 23.

As shown in FIG. 5 and FIG. 6, the photonic crystal reflecting sheet 22 is defined as a plurality of color reflection parts. Among the plurality of color reflection parts, the first color reflection part 31 includes a first photonic crystal for reflecting the light of a red R wavelength. The second color reflection part 32 includes a second photonic crystal for reflecting the light of a green G wavelength. The third color reflection part 33 includes a third photonic crystal for reflecting the light of a blue B wavelength.

Each color reflection part of the photonic crystal reflecting sheet 22 is formed by mixing the photonic crystal with colloid particles, wherein each of the color reflection parts is formed in shape of rectangular parallelepiped. In case, the color reflection parts may have various shapes.

The first, second, and third color reflection parts 31, 32 and 33 are regularly arranged, and the number of first, second and third color reflection parts 31, 32 and 33 is equal. The light transmitted to the LCD panel (not shown) through the photonic crystal reflecting sheet 21 has an equal ratio in each of the wavelengths of R, G and B.

The first, second and third color reflection parts 31, 32 and 33 respectively reflect the predetermined wavelength of R, G and B visible rays emitted from the lamp, and filter the visible rays (a photo bandgap is present between the R visible ray and the G visible ray, and photo bandgap is present between the G visible ray and the B visible ray) except the R, G and B visible rays. Accordingly, the first, second and third color reflection parts filter the light of R, G and B for the color filter film in the LCD panel.

In the edge-type backlight unit, the photonic crystal reflecting sheet 22 functions as the reflecting sheet and the light-diffusion substance below the light-guiding plate. The photonic crystal reflecting sheet 22 selectively reflects the predetermined wavelength of R, G and B, and uniformly diffuses the light, and reflects the light by the predetermined part.

The light-diffusion sheet 20c is provided above the light-guiding plate 21, whereby the uniform luminance is obtained according to the viewing angle by diffusing the light emitted through the photonic crystal reflecting sheet 22. The light-diffusion sheet 20c is formed of PET (Polyethylene Terephthalate) or PC (Polycarbonate) resin. Then, a particle-coating layer is formed on the light-diffusion sheet 20c. The light-diffusion sheet 20c may be omitted if the light-diffusion intensity of the photonic crystal reflecting sheet 22 is large enough.

The first and second prism sheets 20a and 20b improve the frontal luminance of light transmitted and reflected to the upper side of the light-diffusion sheet 20c. The first and second prism sheet 20a and 20b transmit the light of the predetermined angle, and totally reflect the light of the other angles, whereby the light of the other angles is reflected to the lower side of the first and second prism sheets 20a and 20b. Then, the reflected light is reflected again by the photonic crystal reflecting sheet 22, whereby the light is guided to the LCD panel through the light-guiding plate 21.

Although not shown, the backlight unit having the aforementioned structure is fixed to a mold frame. The backlight unit and the LCD panel are together received in a top case and a bottom cover, wherein the top case and the bottom cover protect the backlight unit and the LCD panel from the external impact.

Figure 11:
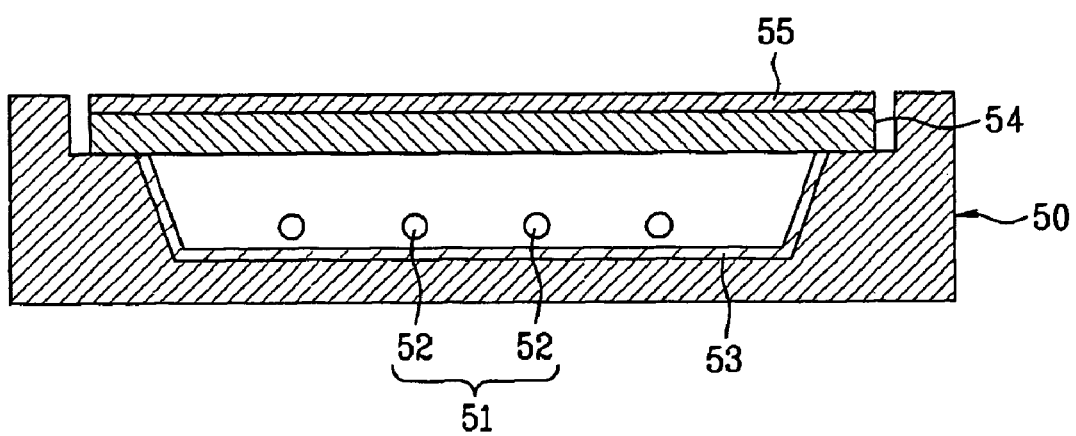
FIG. 11 is a perspective view of showing a backlight unit according to another embodiment of the present invention.

The photonic crystal reflecting sheet of FIG. 4 may be used for a direct-type backlight unit, as shown in FIG. 11. The direct-type backlight unit 50 contains a lamp array 51 having a plurality of lamps 52, a photonic crystal reflecting sheet 53, a light-diffusion sheet 54 and a plurality of optical sheets 55. The lamp array 51 is arranged at fixed intervals on the rear surface of an LCD panel (not shown). The photonic crystal reflecting sheet 53 is formed to cover the lower and lateral sides of the lamp array 51, for concentration of the light emitted from the lamp array 51. The light-diffusion sheet 54 is provided above the lamp array 51, to diffuse the visible rays of R, G and B generated in the photonic crystal reflecting sheet 53. The optical sheets 55 are provided above the light-diffusion sheet 54, to output the diffused visible rays of R, G and B.

Figure 7:
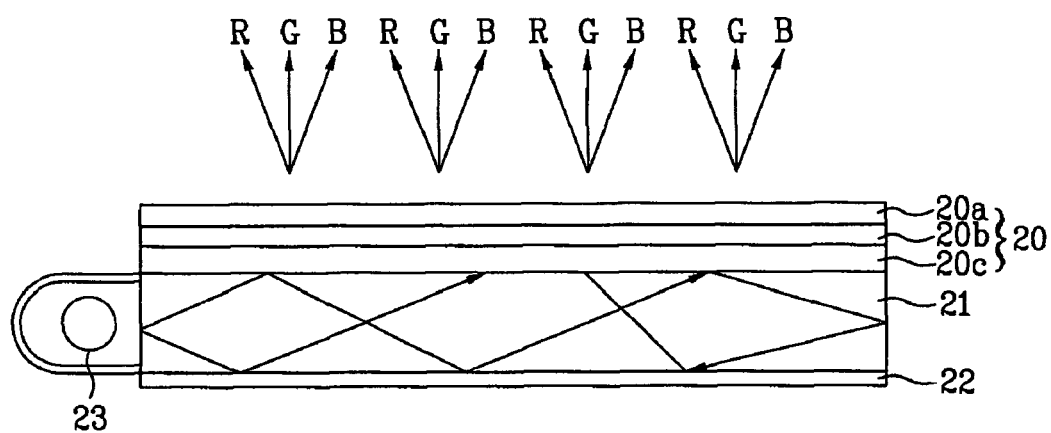
FIG. 7 shows the light passage in a backlight unit according to the present invention.

FIG. 7 shows the light passage in the backlight unit according to the present invention. As shown in FIG. 7, the photonic crystal reflecting sheet 22 selectively reflects the visible rays of R, G and B. Accordingly, it is possible to prevent the visible rays of R, G and B from leaking out to the lower side of the photonic crystal reflecting sheet 22, thereby improving the light efficiency of the backlight unit. The visible rays of R, G and B reflected to the upper side of the photonic crystal reflecting sheet 22 are in the photonic bandgap of the respective wavelength bands, so that it is possible to improve the color purity.

Figure 8:
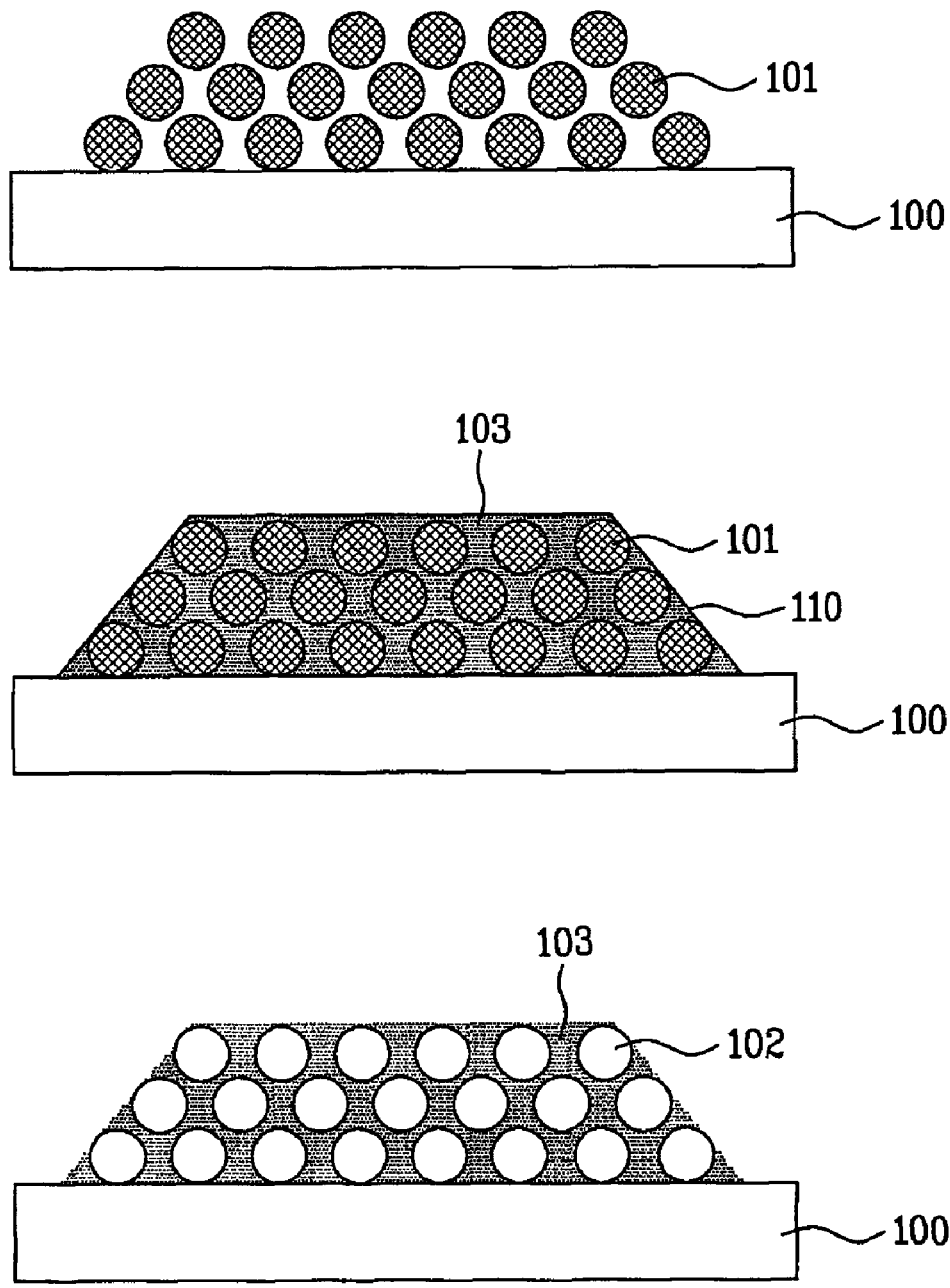
FIG. 8 is a cross sectional view showing a method for forming a photonic crystal reflecting sheet according to one type of the present invention.

FIG. 8 is a cross sectional view showing a method for forming the photonic crystal reflecting sheet according to one aspect. As shown in FIG. 8, sphere-shape dielectrics 101 are piled on a transparent substrate 100 by gravity, and then colloid particles 103 are provided to a mold 110 including the piled sphere-shape dielectrics 101. After setting the shape with the colloid particles 103, the mold 110 and the dielectrics 101 are removed, whereby a plurality of cavities 102 are formed in correspondence with the sphere-shape dielectrics 101. Accordingly, it is possible to form a photonic crystal reflecting sheet 2 having the first, second and third color reflection parts 31, 32 and 33.

Figure 9:
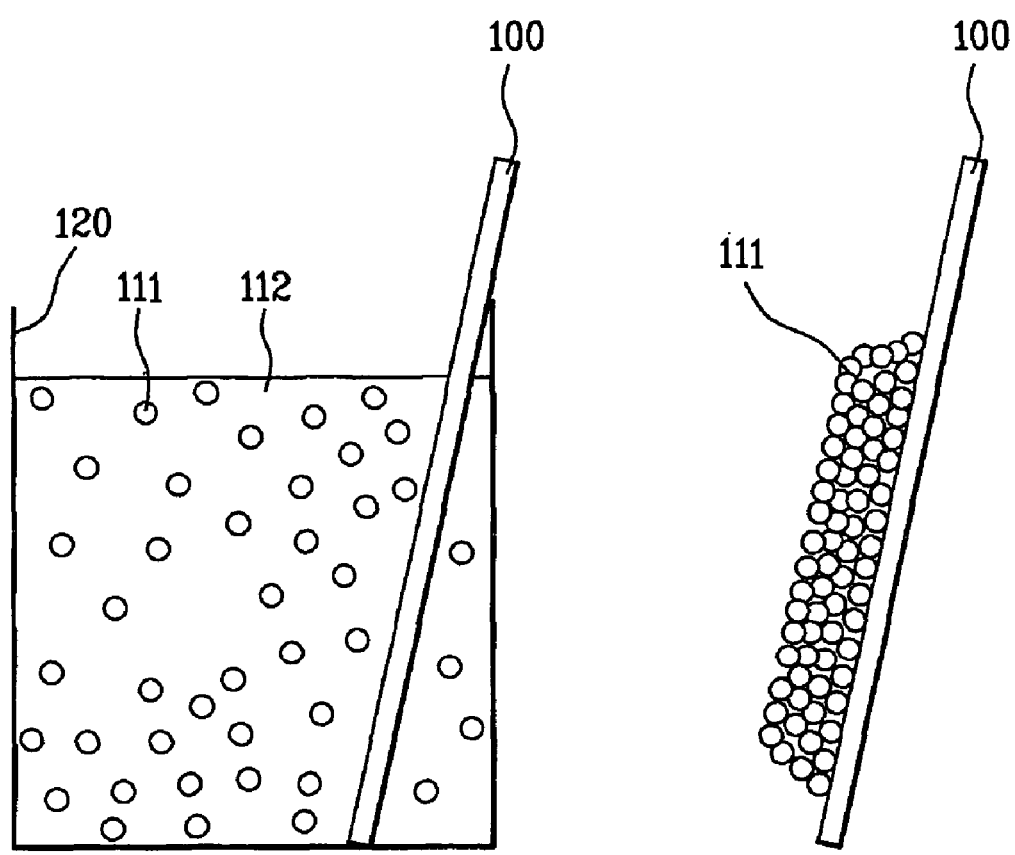
FIG. 9 is a cross sectional view showing a method for forming a photonic crystal reflecting sheet according to another type of the present invention.

FIG. 9 is a cross sectional view showing a method for forming the photonic crystal reflecting sheet according to another type of the present invention. As show in FIG. 9, a substrate 100 is dipped into a tub filled with colloid liquid 112 including sphere-shape dielectrics 111 for selectively reflecting light of a corresponding wavelength. Accordingly, the dielectric particles 111 are formed in the particular crystal structure by the surface tension of liquid and a capillary phenomenon, so that it is possible to form a photonic crystal reflecting sheet having the first, second and third color reflection parts 31, 32 and 33. The remaining portions except the first, second and third color reflection parts 31, 32 and 33 are blocked and shielded.

The corresponding wavelengths of the first, second and third color reflection parts 31, 32 and 33 depend on the size of the sphere-shape dielectric. In this case, electrodes are formed on the rear surface of the substrate 100. Then, the colloid liquid including the sphere-shape dielectrics of the corresponding wavelengths is selectively provided according to the electric field formed by the electrodes of the substrate 100. This process is repetitively performed, thereby forming the photonic crystal reflecting sheet.

In another method, the color reflection parts of the three-dimensional structure may be formed by growing silicon in predetermined directions. In another method, three-dimensional poles are adhered in shape of a woodpile, and the poles are separated from the substrate. This process is repetitively performed, whereby the plurality of photonic crystal layers are formed. Or, the piled multi-patterns may be repetitively etched to form the color reflection parts.

Figure 10A:
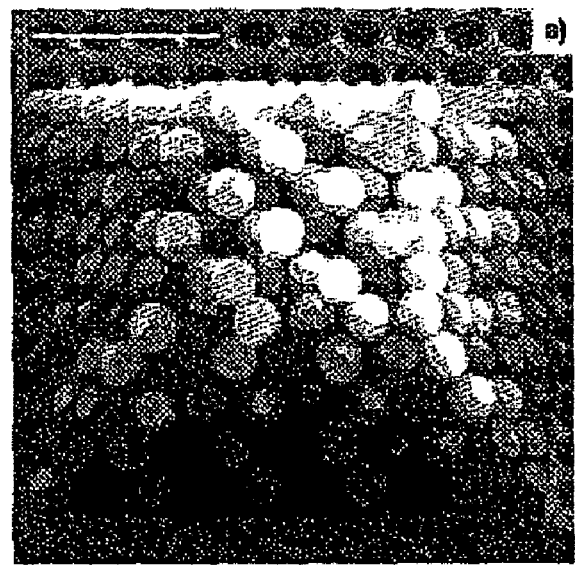
FIG. 10A and FIG. 10B are photographs showing color reflection parts in a photonic crystal reflecting sheet according to the present invention.
Figure 10B:
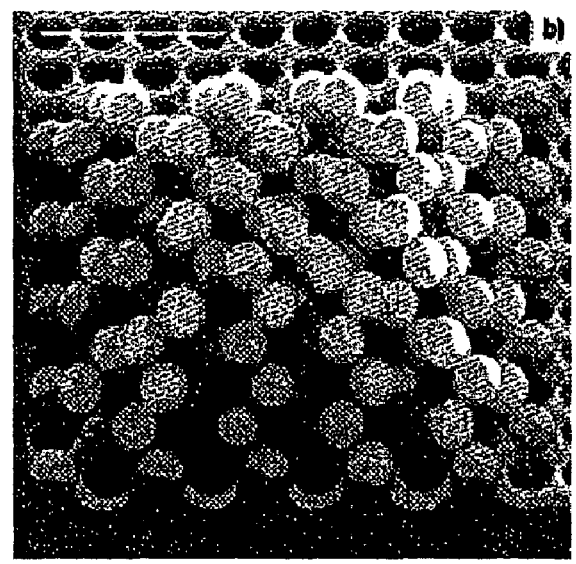

FIG. 10A and FIG. 10B are photographs of showing the respective color reflection parts in the photonic crystal reflecting sheet.

As shown in FIG. 10A and FIG. 10B, the respective color reflection parts are formed of the plurality of photonic crystals for selectively reflecting the visible rays of the predetermined wavelength. As shown in FIG. 10A, when piling the photonic crystals for the color reflection parts, the bottom is larger than the top in size, that is, the photonic crystals are regularly formed in a pyramid. Alternatively, as shown in FIG. 10B, the photonic crystals may be piled randomly.

In the backlight unit according to the present invention, the photonic crystal reflecting sheet is provided with the reflecting sheet and the light-diffusion substance below the light-guiding plate formed as one body. Accordingly, the photonic crystal reflecting sheet functions as both the light-diffusion substance and the reflecting sheet. As a result, it is possible to obtain high reflectivity without the loss of light.

As mentioned above, the backlight unit according to the present invention has the following advantages. In the backlight unit according to the present invention, the photonic crystal reflecting sheet is positioned below the light-guiding plate. That is, the photonic crystal reflecting sheet reflects the leaking light to the upper side, thereby minimizing the loss of luminance.

In the photonic crystal reflecting sheet, the area having the photonic bandgap in correspondence to RGB is repetitively arranged, so that it is possible to omit the light-diffusion substance below the light-guiding plate, and the reflecting sheet below the light-diffusion substance. As a result, the backlight unit has an integrated structure.

For a reflection type LCD device or a reflection-transmitting type LCD device, a reflecting sheet is formed of the photonic crystal for selectively reflecting the light of the predetermined wavelength, thereby improving the color purity in the LCD device.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit comprising:
   a lamp;
   a light-guiding plate formed at one side of the lamp;
   a photonic crystal reflecting sheet formed below the light-guiding plate, a surface of the photonic crystal reflecting sheet having a plurality of parts, each part including photonic crystals that receive light emitted from the lamp through the light-guiding plate and selectively reflect light of a different predetermined wavelength in light guided by the light-guiding plate to a liquid crystal panel; and
   a sheet formed above the light-guiding plate, the sheet having at least one of a prism sheet or a light-diffusion sheet,
   wherein the photonic crystals are arranged in a randomly shaped pile, and
   wherein the photonic crystal reflecting sheet comprises a plurality of spherical cavities, each spherical cavity having a particular size and defining a particular color reflecting part, wherein a particular color reflecting part is capable of reflecting a particular wavelength of light according to the size of the spherical cavity.

2. The backlight unit of claim 1, wherein, among the plurality of parts, a first part includes a first photonic crystal for reflecting light of a red R wavelength, a second part includes a second photonic crystal for reflecting light of a green G wavelength, and a third part includes a third photonic crystal for reflecting light of a blue B wavelength.

3. The backlight unit of claim 2, wherein the first, second and third color reflection parts in the photonic crystal reflecting sheet are equal in number.

4. The backlight unit of claim 1, wherein the parts in the photonic crystal reflecting sheet are equal in number.

5. A backlight unit comprising:
   a lamp array having a plurality of lamps;
   a photonic crystal reflecting sheet formed below the lamp array for covering lower and lateral sides of the lamp array, a surface of the photonic crystal reflecting sheet having a plurality of parts, each part including photonic crystals that selectively reflect light of a different predetermined wavelength in the light emitted from the lamp array to a liquid crystal panel; and
   a sheet formed above the photonic crystal reflecting sheet,
   wherein the photonic crystals are arranged in a randomly shaped pile, and
   wherein the photonic crystal reflecting sheet comprises at least three sizes of spherical cavities defining three groups of color reflecting parts, wherein a first group of parts includes photonic crystals for reflecting light of a red R wavelength, a second group of parts includes photonic crystals for reflecting light of a green G wavelength, and a third group of parts includes photonic crystals for reflecting light of a blue B wavelength.

6. The backlight unit of claim 5, wherein the parts in the photonic crystal reflecting sheet are equal in number.

* * * * *